US007636912B2

(12) United States Patent
Saad et al.

(10) Patent No.: US 7,636,912 B2
(45) Date of Patent: Dec. 22, 2009

(54) CUSTOM ASSEMBLY TO EXTEND A WIZARD

(75) Inventors: Stephanie Saad, Kirkland, WA (US); Craig Skibo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 65 days.

(21) Appl. No.: 10/978,016

(22) Filed: Oct. 28, 2004

(65) Prior Publication Data

US 2006/0101458 A1    May 11, 2006

(51) Int. Cl.
    *G06F 9/44* (2006.01)
(52) U.S. Cl. .................. 717/109; 717/107; 717/113
(58) Field of Classification Search ........... None
    See application file for complete search history.

(56) References Cited

U.S. PATENT DOCUMENTS 6,237,135 B1 * 5/2001 Timbol .................. 717/107
2002/0184609 A1 * 12/2002 Sells et al. ............... 717/106
2003/0140332 A1 * 7/2003 Norton et al. ............ 717/106
2003/0226132 A1 * 12/2003 Tondreau et al. ......... 717/116

OTHER PUBLICATIONS

Brian Johnson, Inside Microsoft visual studio .NET 2003, Microsoft Press, Chapter 9, Visual Studio .NET Wizards.*
Craig Skibo's Weblog, "Beta 1 and the new Template Wizard", http://blogs.msdn.com/craigskibo/archive/2004/06/29/168994.aspx.*
The Authoritative Dictionary of IEEE Standards Terms, 7th edition, Published by Standards Inforamtion Network IEEE Press, Dec. 2000, p. 55.*

* cited by examiner

*Primary Examiner*—Tuan Q Dam
*Assistant Examiner*—Zheng Wei
(74) *Attorney, Agent, or Firm*—Woodcock Washburn LLP

(57) ABSTRACT

A custom assembly is registered and supported for extending a wizard, such as a template wizard, to perform custom actions. A data file is provided to a wizard. The wizard generates project files, which are then adjusted based on an assembly with custom code. The assembly with custom code may provide a user-created custom interface that receives user input and adjusts the project files accordingly. These project files may be associated with the template.

28 Claims, 5 Drawing Sheets

US 7,636,912 B2

CUSTOM ASSEMBLY TO EXTEND A WIZARD

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2003-2004, Microsoft Corp.

FIELD OF THE INVENTION

The present invention is directed to computer programming, and more particularly, to the modification and customization of software applications.

BACKGROUND OF THE INVENTION

A wizard is an interactive help utility that guides the user through a potentially complex task. Wizards are often implemented as a sequence of dialog boxes that the user can move forward and backward through, filling in the details required. Expertise is encapsulated in the software wizard, allowing the average user to perform expertly. For example, wizards have been added to software applications to help users configure peripherals. A wizard guides the user through steps such as selecting installation options and ports, installing a software driver, creating links to other applications, and setting other parameters. Wizards thus provide an improved user interface that allows users with less technical sophistication to efficiently use their computer and software applications.

Modern computer users are familiar with the use of file templates. File templates allow a user to create a new file with a readymade set of initial properties, instead of starting work on a new file from scratch. One common template is a letter template in a word processing program, such as MICROSOFT WORD®. A user of such a template may first select the appropriate template, which operates to create a new file with desirable file properties. The user may then be prompted to enter data into several fields. For example, the user may fill in an address field, a date field, a salutation field, and so on. After inserting data into the fields, the user may go on to add additional content to the letter, and save it to a desired location. There are presently many kinds of templates available. Letters, resumes, memos, and so forth are commonly created from word processing application templates, while web pages of various styles are created from templates in webpage editing software, and various files created for software applications are generated from templates in integrated development environments (IDEs).

More particularly, with reference to IDEs, most modern software is typically created with a great deal of computer automated assistance. Such assistance is commercially available through any of a number of IDEs. For example, MICROSOFT'S VISUAL STUDIO®, BORLAND'S C++BUILDER®, METROWERK'S CODE WARRIOR®, and IBM'S WEBSPHERE STUDIO® are all products presently available to assist in software creation. Such products provide a range of useful functions, such as templates for creating new files that may be subsequently adapted to the particular needs of a particular undertaking, coordinating communications between multiple developers working together on large applications, assisting in the actual writing of source code, assisting in specifying how a source code file will be compiled, and providing compilers and other processes that convert source code files and the like into executable files.

While many IDE users are familiar with and commonly use templates, fewer IDE users create their own templates for later use. This is at least in part because the creation of templates in modem IDEs is time-consuming, difficult, and error prone. The creation of at least two separate files is needed to instruct a template building engine in the details of desired template properties. A first file may point to the template wizard dialog for user insertion of file properties, while a second file provides the code for placing and formatting the data entered into the dialog. Because the second file is code that operates in conjunction with the template building engine, the template building engine is more susceptible to attacks, bugs, and malfunction.

The difficulty of creating custom templates in modem IDEs is particularly troublesome in light of the working needs of modem software developers. Developers are a group of computer users who uniquely benefit from the use of templates. Developers understand the details of their own work better than those of a factory-provided template. They may often work on related projects, or improvements and optimizations of past projects, which lend themselves to re-use of previously developed code. Redundant coding is highly inefficient and can be frustrating for developers as they reconsider problems that may have already been thought through.

For example, in early versions of VISUAL STUDIO it was difficult to create new templates and install them into VISUAL STUDIO or to modify existing templates. Templates consisted of multiple files (e.g., .VSZ, .VSDIR, various JScript files), and users were discouraged from modifying these templates by the complexity and the amount of work required. The multi-file format made it difficult to easily exchange templates. Template development was generally limited to VISUAL STUDIO developers.

Thus, in previous implementations of templates, template customization could be achieved by defining the template creation in a JScript file which could call certain defined functions to create the template. However, there are problems with the JScript implementation, such as there is no simplified authoring experience for the default user experience, Jscript is extremely difficult to debug, Jscript is a relatively inflexible programming language, Jscript is not typically a first-level skill in developers who are more familiar with managed code, and limited interfaces are provided for interacting with the project during template creation.

The template architecture has recently been designed to assist less sophisticated users in developing and exchanging content, such as a project template or a project item template. With the template architecture, the templates are driven by a declarative extensible markup language (XML) (e.g., .VSTEMPLATE) file. This file simplifies template creation by declaring, using proscribed XML tags, the contents of the template and the basic steps of its creation.

For some templates, this declarative XML format is too restrictive. Some templates require the ability to perform extensive custom actions, such as showing a custom user interface to gather user input (e.g., build settings, database connection strings, device platform targets, document names) to configure the project, inserting entries into the project's global resources file during item creation, as well as any other custom action not supported by the declarative XML .VSTEMPLATE.

A template wizard is provided in the template architecture. For example, to create a new template for a project or project item, a user would perform a "File" → "Save as Template" command. Such a command walks a user through a wizard which collects information about how the template should be displayed, which files should be included, etc. The wizard generates a single-file template and optionally makes it available for the running instance of VISUAL STUDIO.

However, the wizard is not easily customizable or extended. It would be desirable for a wizard to be easily customizable and extensible.

SUMMARY OF THE INVENTION

The present invention is directed to registering and supporting a custom assembly for extending a wizard, such as a template wizard, to perform custom actions.

A data file is provided to a wizard. The wizard generates project files, which are then adjusted based on an assembly with custom code. The assembly with custom code may provide a user-created custom interface that receives user input and adjusts the project files accordingly. These project files may be associated with the template.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

As described further herein, templates can be customized via an interface, such as a user-created custom interface. The interface is displayed and user input is received to parameterize a template (e.g., in conjunction with a wizard). Moreover, additional parameters to be placed in a template can be provided by the customization, along with other custom actions. Also, a template to be used can be selected from a group of multiple templates based on user input (e.g., "uses code separation" versus "does not use code separation").

Figure 1:
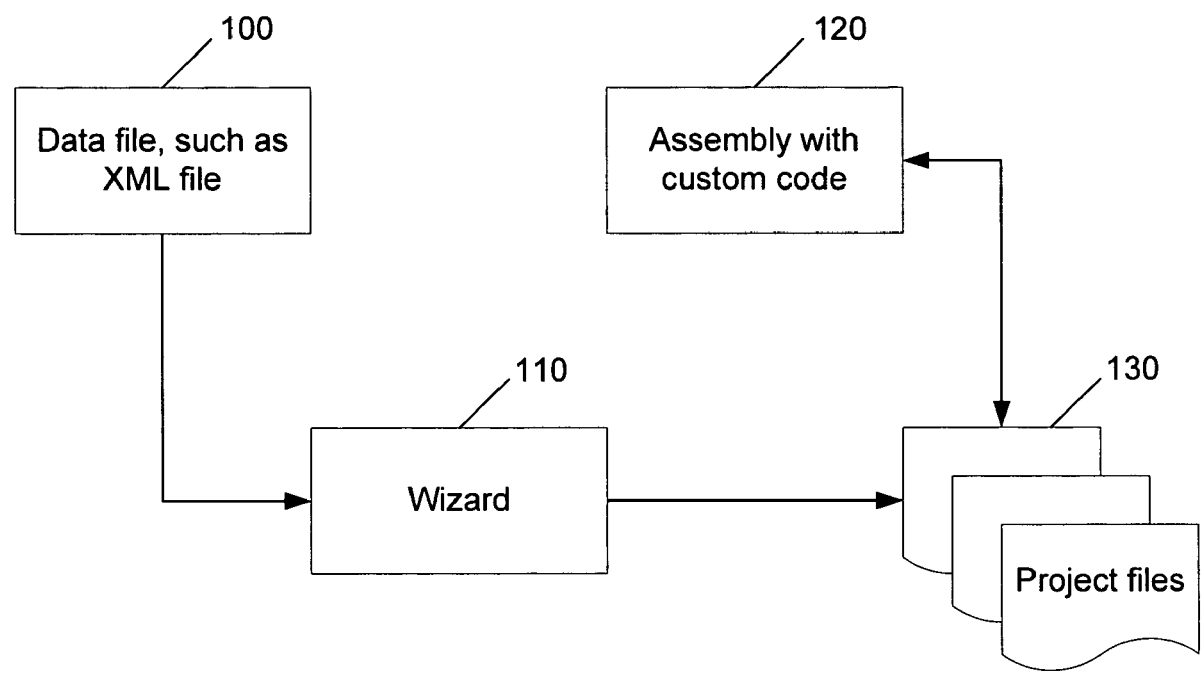
FIG. 1 is a block diagram showing an exemplary system in accordance with the present invention.

FIG. 1 is a block diagram showing an exemplary system in accordance with the present invention. A data file 100, such as an XML file, is provided to a wizard 110. The wizard generates project files 130, which are then adjusted based on an assembly with custom code 120. The assembly with custom code 120 may provide a user-created custom interface that receives user input and adjusts the project files 130 accordingly. These project files 130 may be associated with the template.

More particularly, an assembly with custom code 120 is desirably written that extends the wizard 110, and the assembly is desirably registered (e.g., in a core XML file). A call can be made to the custom code 120 (e.g., written by the user) so that the custom code 120 may act in conjunction with the wizard 110 to provide a user-customized template.

Thus, the assembly with custom code 120 acts as an extension assembly that may be created to extend a wizard 110, such as an XML-driven or other data-driven wizard. XML is desirable because it has the ability to separate configuration from execution, allowing for the definition of a common execution environment which can be driven off a user-authorable XML configuration file. Extensions are desirably written in managed code, and these extension assemblies can then be registered in the VSTEMPLATE file, in an embodiment using VISUAL STUDIO for example, with the addition of a few lines of XML, and may then be invoked whenever the wizard is run.

Thus, with respect to VISUAL STUDIO, for example, a user would provide an XML file 100, which is passed to a wizard 110, which generates the VISUAL STUDIO project files 130. A project is a file or plurality of files that cooperate to accomplish a unified set of application functions. An assembly with custom code 120 is desirably attached that adjusts the VISUAL STUDIO project files 130 after being generated by the wizard 110.

Figure 2:
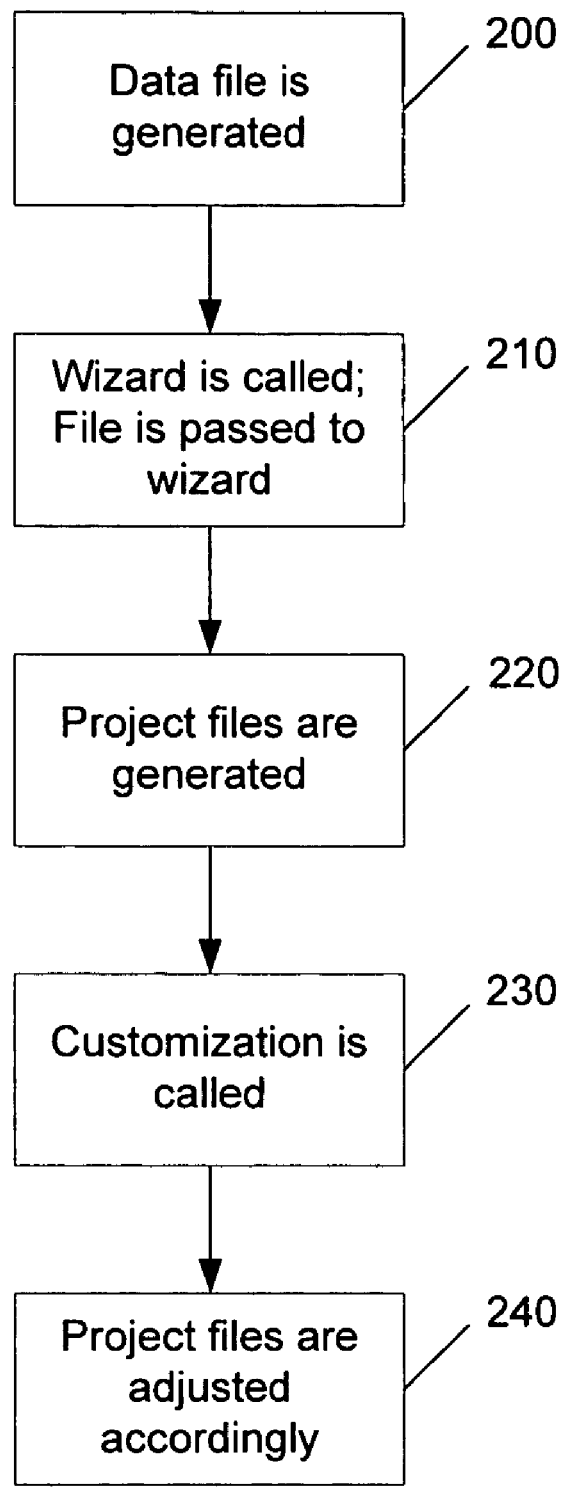
FIG. 2 is a flow diagram of an exemplary method of customizing a wizard in accordance with the present invention.

FIG. 2 is a flow diagram of an exemplary method of customizing a wizard in accordance with the present invention. At step 200, a data file to be used by the wizard is created. The wizard is then called, e.g., by a template engine, and the data file is passed to the wizard, at step 210. The wizard reads in the data file and, in turn, generates project files, at step 220. Thus, if the data file is an XML file, for example, the wizard reads in the XML (and loads in the extensions for the XML) and processes the XML. After the project files are generated by the wizard, the customization that was created by the user, for example, is then called by the project files, at step 230. The project files are then adjusted in accordance with the customization, at step 240.

A template engine may provide a variety of functions relating to creating and/or utilizing templates. It may create templates by indexing the content in a group of files and creating one or more metadata files representing the indexed information. The indexed content and the metadata may be collectively referred to herein as a template. The template engine may also assist a user in utilizing a template by creating a new file from a template. The template engine may draw on the indexed content and metadata to supply information to user interface elements and/or processes that prompt a user to enter data, and may subsequently insert the entered data throughout a newly created file.

Figure 3:
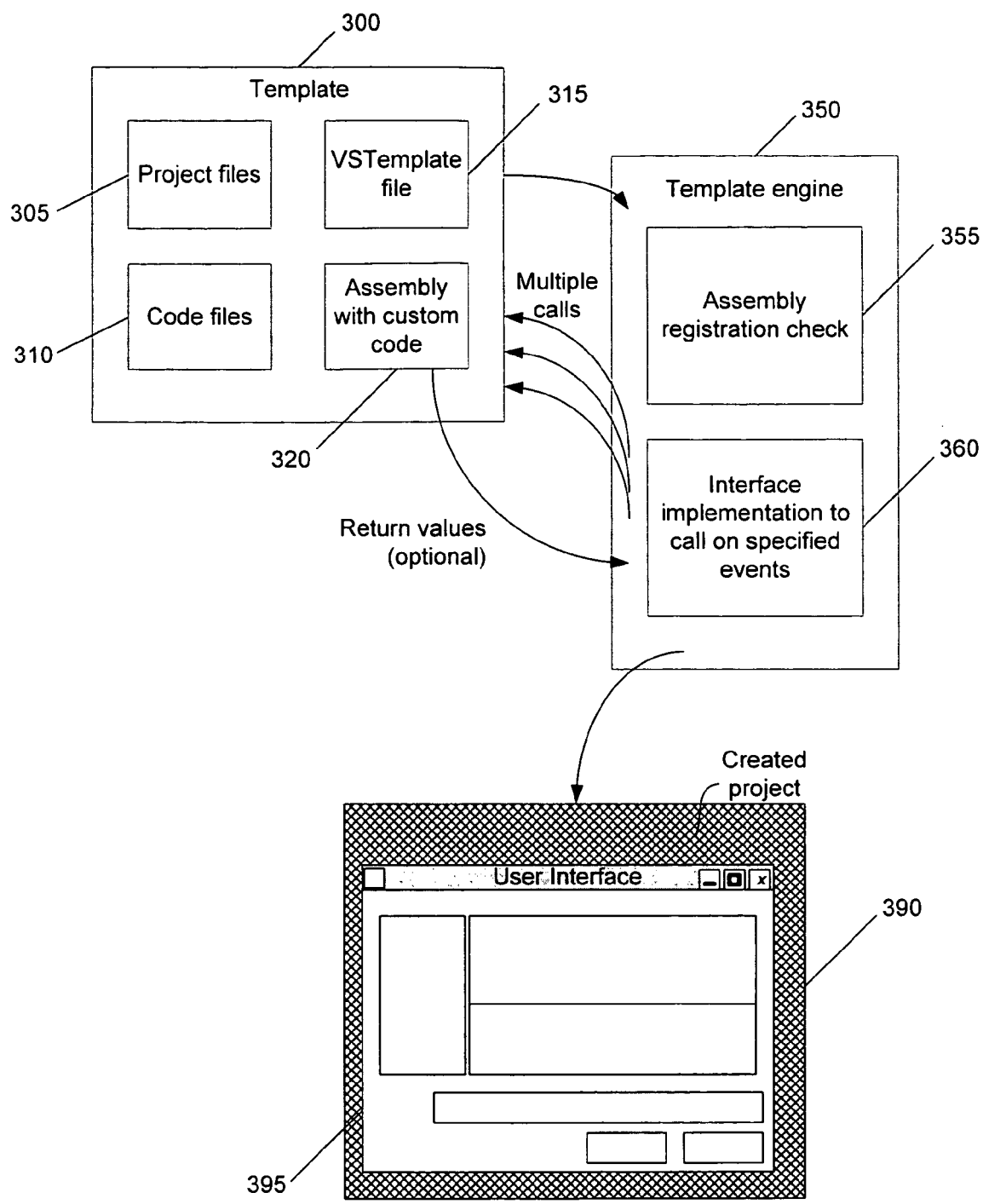
FIG. 3 is a block diagram showing another exemplary system in accordance with the present invention.

FIG. 3 is a block diagram showing another exemplary system in accordance with the present invention. A template engine 350 calls in a template 300 and, using files within the template 300, creates a project 390, such as a customized user interface 395 for use with a wizard, for example.

The template engine 350 performs a check to determine whether a custom wizard extension assembly (e.g., assembly with custom code) is registered. If so, the template engine 350 will find the registered assembly and call on the implemented interface at specified points in the template creation process. At this time, the custom assembly may display user interface, open files, insert data into files already in the project, or perform any other DTE action (DTE is the top-level object in the Visual Studio automation object model). The assembly also may pass back parameters to the template engine to be used during the template parameter replacement process. If so, these parameters will then be used during template creation. The final output is the created project 390.

More particularly, an exemplary template 300 comprises a variety of files, such as project files 305 and code files 310. Moreover, the template 300 may comprise a template file 315, such as a VSTEMPLATE file, and an assembly with custom code 320. The custom code assembly 320 comprises the customization for a wizard (in this case, a template wizard).

The template 300, and in this example, the VSTEMPLATE file 315, registers the assembly to run the custom code 320. The registration contains the registry of the assembly containing the custom code and the class in the assembly which implements the IWizard interface, for example. The user can optionally specify 1 . . . n custom parameters to pass to the wizard on run.

An example of such code is as follows:

```
<WizardExtension>
    <Assembly> Foo, Version = 1.0.3300.0, Culture = neutral,
PublicKeyToken = b03f5f7f11d50a3a, Custom = null</Assembly>
    <FullClassName> VBWizards.WindowsApplication</
    FullClassName>
</WizardExtension>
```

The WizardExtension contains the registration elements. The assembly can desirably be any valid assembly name, such as a full assembly name of an assembly in the GAC (global assembly cache), a full path name, a file name for when the assembly is next installed, or a URL. An exemplary full assembly name of an assembly in the GAC is Foo, Version=1.0.3300.0, Culture=neutral, PublicKeyToken=b03f5f7f11d50a3a, Custom=null. An exemplary full path name is C:\foo.dll. An exemplary file name for when the assembly is installed next to devenv.exe is foo.dll. An exemplary URL is http://localhost/foo.dll. The FullClassName is the fully qualified name of a class (Namespace.ClassName) within the assembly that implements the IWizard interface. A single assembly can implement the custom code for any number of wizards, so an assembly could have classes named VBWizards.ConsoleProject, VBWizards.WebApplication, VBWizards.WindowsApplication, etc.

When a wizard is invoked, the template engine 350 checks the template file 315 to determine if an extension assembly has been created and is registered 355. If so, an interface 360 calls the assembly 320. The assembly 320 may return values to the template engine 350. The project 390 is then created using the template and the customization code.

The registered assembly (e.g., the assembly with custom code 320) will implement the IWizard interface definition, for example. On launch, the template engine 350 will check to see if a customization assembly is registered 355. If so, the template engine 350 will call into the assembly at a series of defined interface points, each one representing a critical event in the template creation process (e.g., start, finish, etc.).

The custom interface 360 comprises a number of elements to support full customization. The custom interface provides the ability to execute code at any one of several defined points in the project created from template progression. The custom interface provides the ability to control any function exposed via automation (DTE) in the Visual Studio IDE. This means that a user can add items, open windows, close windows, access other project items and insert code, etc; essentially perform any function which is supported by the rich programmatic interfaces to the IDE. The custom interface provides the ability to collect parameters to configure the project files, or even define new parameters to be used. On launch, the interface will desirably pass an empty Dictionary object to the assembly. It also passes the list of parameters to the custom code, pass the list of parameters to the wizard assembly to allow it to modify, remove, or add new replaceable parameters. The custom interface provides the ability to abort on cancel.

An exemplary interface 360 exposed for custom assemblies to implement is as follows:

```
public interface IWizard
{
    void RunStarted(object automationObject,
System.Collections.Generic.Dictionary<string, string>
replacementsDictionary, WizardRunKind runKind,
object[ ] customParams);
    void ProjectFinishedGenerating(EnvDTE.Project project);
    void ProjectItemFinishedGenerating(EnvDTE.ProjectItem
projectItem);
    bool ShouldAddProjectItem(string filePath);
    void BeforeOpeningFile(EnvDTE.ProjectItem projectItem);
    void RunFinished( );
}
public class WizardCancelledException : System.Exception
{
    public WizardCancelledException( ) : base( )
    {
    }
}
public class WizardBackoutException : System.Exception
{
    public WizardBackoutException( ) : base( )
    {
    }
}
```

Figure 4:
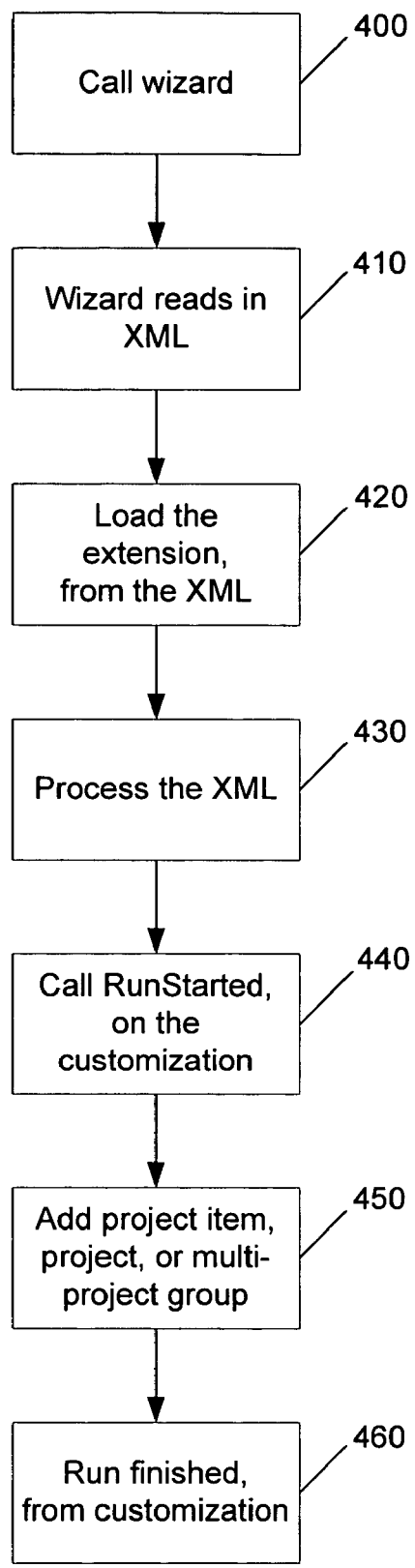
FIG. 4 is a flow diagram of another exemplary method of customizing a wizard in accordance with the present invention.

FIG. 4 is a flow diagram of another exemplary method of customizing a wizard in accordance with the present invention. At step 400, a wizard is called. The wizard then reads in the associated data, such as XML, at step 410. The extension (customization) is then loaded, and the XML is processed, at steps 420 and 430, respectively. After the XML has been processed, the customization is run, at step 440. The appropriate changes are made, for example, to a project item, project, or multi-project group, at step 450. The changes may be made to a plurality of project items, projects, and/or multi-project groups, pursuant to the extension. After all the changes have been made, the customization is finished at step 460.

An example of a customization based on this extensible architecture is now provided. An application, such as MICROSOFT OFFICE® has projects that show a custom user interface which is used to gather user information about the document save location. That information is fed back to the project system when the project is created so that the code and document can be correctly packaged together.

An exemplary IWizard-based implementation is as follows. The interface is implemented in a separate user assembly. The VSTO wizard implements the IWizard interface, and then calls into its own custom WizardManager to display a custom user interface and collect user information. This information is then returned back to the IDE and used to configure the Office Project.

```
internal class VSTOWizard : IWizard
{
    private WizardManager wizardManager;
    public VSTOWizard( )
    {
    }
    void IWizard.RunStarted(object application, Dictionary<string,
string> replacementsDictionary, WizardRunKind runKind,
object[ ] customParams)
    {
        try
        {
            OleServiceProvider oleSP = application as
            OleServiceProvider;
        wizardManager = new WizardManager(oleSP,
        replacementsDictionary);
            wizardManager.Execute( );
        }
        catch (COMException ex)
        {
            if (ex.ErrorCode ==
            HResults.OLE_E_PROMPTSAVECANCELLED)
                throw new WizardCancelledException( );
            else
                throw;
        }
    }
}
```

Exemplary Computing Environment

Figure 5:
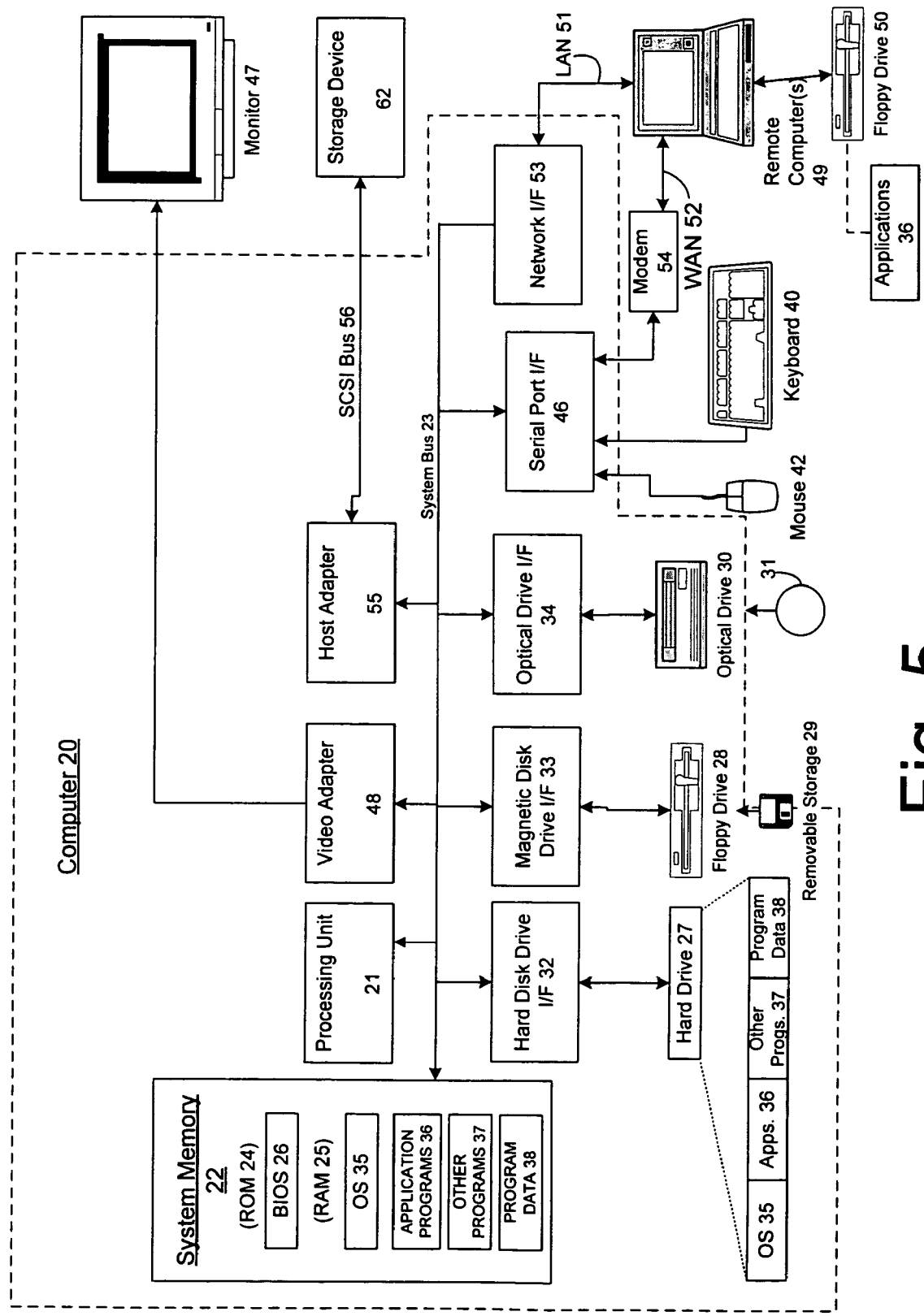
FIG. 5 is a block diagram representing a computer system in which aspects of the present invention may be incorporated.

Numerous embodiments of the present invention may execute on a computer. FIG. 5 and the following discussion are intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types.

Those skilled in the art will appreciate that the invention may be practiced with other computer system configurations, including handheld devices, multiprocessor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 5, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 5 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 5. The logical connections depicted in FIG. 5 include a local area network (LAN) 51 and a wide area network (WAN) 52. Such networking environments are commonplace in offices, enterprise wide computer networks, intranets and the internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed:

1. A method of customizing a software application comprising:

registering a custom wizard extension assembly with a wizard, the extension assembly being custom code for being called to and thereby executed by the wizard, the custom code being managed code written in an extensible markup language (XML) for being executed by the wizard, the registering of the extension assembly with the wizard including specifying the extension assembly as an extension to the wizard in a template file associated with the wizard;

receiving a user-authorable data file at the wizard, the wizard including first functionality for generating a plurality of project files from the data file, the registered custom wizard extension assembly comprising the custom code with second functionality beyond the first functionality of the wizard and therein extending the wizard;

generating the plurality of project files via the wizard from the user-authorable data file and based on the first functionality of the wizard;

finding, by the wizard, in the template file that the extension assembly has been specified therein as an extension to the wizard;

determining, by the wizard, that the extension assembly has been registered therewith based on finding the extension assembly specified as an extension to the wizard in the template file, and based on the determining concluding, by the wizard, that the wizard is to automatically call to the custom code of the custom wizard extension assembly with respect to such generated plurality of project files upon generating the plurality of project files, and is to automatically adjust the generated project files based on the called custom code of the custom wizard extension assembly and the second functionality of the called custom code of the custom wizard extension assembly;

upon determining, by the wizard, that the extension assembly has been registered, calling, by the wizard, upon generating the plurality of project files, the custom code of the custom wizard extension assembly with respect to such generated plurality of project files; and upon determining, by the wizard, that the extension assembly has been registered, adjusting, by the wizard, the generated project files based on the called custom code of the custom wizard extension assembly and the second functionality of the called custom code of the custom wizard extension assembly.

2. The method of claim 1, wherein the user-authorable data file comprises an extensible markup language (XML) file and extensions for the XML file.

3. The method of claim 1, wherein the wizard is a template wizard.

4. The method of claim 3, wherein generating the plurality of project files comprises a template engine calling in a template and using files within the template to generate the project files.

5. The method of claim 4, wherein the template comprises a template file and the custom wizard extension assembly.

6. The method of claim 1, wherein the project files comprise a customized user interface.

7. The method of claim 1, wherein the project files comprise at least one of a project item, a project, and a multi-project group.

8. The it method of claim 1, wherein the custom wizard extension assembly acts in conjunction with the wizard to provide a user-customized template.

9. The method of claim 1, wherein the wizard is a first wizard and said registering the custom wizard extension assembly comprises registering the custom wizard extension assembly within a global assembly cache, such that a second wizard may call the custom wizard extension assembly.

10. A system for software application customization comprising:
   a first wizard that receives a user-authorable data file and generates a plurality of project files from the user-authorable data file based on first functionality included with the first wizard;
   a custom wizard extension assembly that modifies the project files, the custom wizard extension assembly being registered with and responsive to the first wizard, the extension assembly being custom code for being called to and thereby executed by the wizard, the custom code being managed code written in an extensible markup language (XML) for being executed by the wizard, the registering of the extension assembly with the wizard including specifying the extension assembly as an extension to the wizard in a template file associated with the wizard, the registered custom wizard extension assembly comprising the custom code with second functionality beyond the first functionality of the first wizard and therein extending the first wizard, the first wizard finding in the template file that the extension assembly has been specified therein as an extension to the wizard and determining that the extension assembly has been registered therewith based on finding the extension assembly specified as an extension to the wizard in the template file, and based on the determining concluding that the first wizard is to automatically call to the custom code of the custom wizard extension assembly with respect to such generated plurality of project files upon generating the plurality of project files, and is to automatically adjust the generated project files based on the called custom code of the custom wizard extension assembly and the second functionality of the called custom code of the custom wizard extension assembly, the extension assembly being called by the first wizard upon generating the plurality of project files and with respect to such generated plurality of project files so as to adjust the generated project files based on the custom code of the custom wizard extension assembly and the second functionality of the custom code of the custom wizard extension assembly; and
   a global assembly cache that registers the custom wizard extension assembly with wizards including the first wizard and a second wizard, such that the second wizard may call the custom wizard extension assembly.

11. The system of claim 10, wherein the user-authorable data file comprises an extensible markup language (XML) file and extensions for the XML file.

12. The system of claim 10, wherein the first wizard is a template wizard.

13. The system of claim 10, farther comprising a template engine that calls a template that is used to generate the project files.

14. The system of claim 13, wherein the template comprises a template file and the custom wizard extension assembly.

15. The system of claim 10, wherein the project files comprise a customized user interface.

16. The system of claim 10, wherein the project files comprise at least one of a project item, a project, and a multi-project group.

17. The system of claim 10, wherein the custom wizard extension assembly acts in conjunction with the wizard to provide a user-customized template.

18. A computer-readable medium having computer-executable components comprising:
   a first wizard component for receiving a user-authorable data file and generating a plurality of project files from the user-authorable data file based on first functionality included with the first wizard;
   a custom wizard extension assembly component for modifying the project files, the custom wizard extension assembly being registered with and responsive to the first wizard, the extension assembly being custom code for being called to and thereby executed by the wizard, the custom code being managed code written in an extensible markup language (XML) for being executed by the wizard, the registering of the extension assembly with the wizard including specifying the extension assembly as an extension to the wizard in a template file associated with the wizard, the registered custom wizard extension assembly comprising the custom code with second functionality beyond the first functionality of the first wizard and therein extending the first wizard, the first wizard finding in the template file that the extension assembly has been specified therein as an extension to the wizard and determining that the extension assembly has been registered therewith based on finding the extension assembly specified as an extension to the wizard in the template file, and based on the determining concluding that the first wizard is to automatically call to the custom code of the custom wizard extension assembly with respect to such generated plurality of project files upon generating the plurality of project files, and is to automatically adjust the generated project files based on the called custom code of the custom wizard extension assembly and the second functionality of the called custom code of the custom wizard extension assembly, the extension assembly being called by the first wizard upon generating the plurality of project files and with respect to such generated plurality of project files so as to adjust the generated project files based on the custom code of the custom wizard extension assembly and the second functionality of the custom code of the custom wizard extension assembly; and
   a global assembly cache that registers the custom wizard extension assembly with wizards including the first wizard and a second wizard, such that the second wizard may call the custom wizard extension assembly.

19. The computer-readable medium of claim 18, wherein the user-authorable data file comprises an extensible markup language (XML) file and extensions for the XML file.

20. The computer-readable medium of claim 18, wherein the first wizard component comprises a template wizard.

21. The computer-readable medium of claim 18, further comprising a template engine component that calls a template that is used to generate the project files.

22. The computer-readable medium of claim 18, wherein the project files comprise a customized user interface.

23. The computer-readable medium of claim 18, wherein the project files comprise at least one of a project item, a project, and a multi-project group.

24. The computer readable medium of claim 18, wherein the custom wizard extension assembly acts in conjunction with the wizard to provide a user-customized template.

25. A method in a computer system for displaying on a display device a customized user interface, the method comprising the steps of:
- registering a custom wizard extension assembly with a wizard, the extension assembly being custom code for being called to and thereby executed by the wizard, the custom code being managed code written in an extensible markup language (XML) for being executed by the wizard, the registering of the extension assembly with the wizard including specifying the extension assembly as an extension to the wizard in a template file associated with the wizard;
- generating, from a user-authorable input data file, a plurality of project files via the wizard, the wizard including first functionality for generating the plurality of project files from the data file, the registered custom wizard extension assembly comprising the custom code with second functionality beyond the first functionality of the wizard and therein extending the wizard;
- receiving the custom wizard extension assembly from a user;
- determining, by the wizard, that the extension assembly has been registered therewith based on finding the extension assembly specified as an extension to the wizard in the template file, and based on the determining concluding, by the wizard, that the wizard is to automatically call to the custom code of the custom wizard extension assembly with respect to such generated plurality of project files upon generating the plurality of project files, and is to automatically adjust the generated project files based on the called custom code of the custom wizard extension assembly and the second functionality of the called custom code of the custom wizard extension assembly;
- calling, by the wizard, upon generating the plurality of project files, the custom code of the custom wizard extension assembly with respect to such generated plurality of project files;
- adjusting, by the wizard, the generated project files based on the called custom code of the custom wizard extension assembly and the second functionality of the called custom code of the custom wizard extension assembly to generate a customized user interface; and
- displaying on the display device the customized user interface.

26. The method of claim 25, wherein the wizard is a template wizard.

27. The method of claim 26, wherein generating the plurality of project files comprises a template engine calling in a template and using files within the template to generate the project files.

28. The method of claim 25, wherein the wizard is a first wizard and said registering the custom wizard extension assembly comprises registering the custom wizard extension assembly within a global assembly cache, such that a second wizard may call the custom wizard extension assembly.

* * * * *

UNITED STATES PATENT AND TRADEMARK OFFICE
CERTIFICATE OF CORRECTION

| | | |
|---|---|---|
| PATENT NO. | : 7,636,912 B2 | |
| APPLICATION NO. | : 10/978016 | |
| DATED | : December 22, 2009 | |
| INVENTOR(S) | : Stephanie Saad et al. | |

It is certified that error appears in the above-identified patent and that said Letters Patent is hereby corrected as shown below:

In column 10, line 5-6, in Claim 1, delete "for being" and insert -- that is --, therefor.

In column 10, line 6, in Claim 1, before "executed" delete "thereby".

In column 10, line 7-8, in Claim 1, delete "written in an extensible markup language (XML) for being" and insert -- that is --, therefor.

In column 10, line 50, in Claim 1, delete "assembly." and insert -- assembly, wherein:
    the wizard comprises a custom interface that is used to adjust the project files during generation by executing code at at least one of several defined points in the data file;
    the custom interface is used by a user at one of the defined points to input a parameter during generation of the project files; and
    the custom interface uses the parameter to configure the project files. --, therefor.

In column 11, line 1, in Claim 8, before "method" delete "it".

In column 11, line 20-21, in Claim 10, after "managed code" delete "written in an extensible markup language (XML)".

In column 11, line 53, in Claim 10, delete "assembly." and insert -- assembly, wherein:
    the wizard comprises a custom interface that is used to adjust the project files during generation by executing code at at least one of several defined points in the data file;
    the custom interface is used by a user at one of the defined points to input a parameter during generation of the project files; and
    the custom interface uses the parameter to configure the project files. --, therefor.

In column 11, line 60, in Claim 13, delete "farther" and insert -- further --, therefor.

In column 12, line 17, in Claim 18, delete "for being" and insert -- that is --, therefor.

Signed and Sealed this
Twenty-fifth Day of January, 2011

David J. Kappos
*Director of the United States Patent and Trademark Office*

CERTIFICATE OF CORRECTION (continued)
U.S. Pat. No. 7,636,912 B2

In column 12, line 17, in Claim 18, before "executed" delete "thereby".

In column 12, line 18-19, in Claim 18, delete "written in an extensible markup language (XML) for being" and insert -- that is --, therefor.

In column 12, line 51, in Claim 18, delete "assembly." and insert -- assembly, wherein:
    the wizard comprises a custom interface that is used to adjust the project files during generation by executing code at at least one of several defined points in the data file;
    the custom interface is used by a user at one of the defined points to input a parameter during generation of the project files; and
    the custom interface uses the parameter to configure the project files. --, therefor.

In column 13, line 5-6, in Claim 25, delete "for being" and insert -- that is --, therefor.

In column 13, line 6, in Claim 25, before "executed" delete "thereby"

In column 13, line 7-8, in Claim 25, delete "written in an extensible markup language (XML) for being" and insert -- that is --, therefor.

In column 14, line 15-16, in Claim 25, delete "interface." and insert -- interface, wherein:
    the wizard comprises a custom interface that is used to adjust the project files during generation by executing code at at least one of several defined points in the data file;
    the custom interface is used by a user at one of the defined points to input a parameter during generation of the project files; and
    the custom interface uses the parameter to configure the project files. --, therefor.